(12) United States Patent
Turner et al.

(10) Patent No.: US 10,779,516 B2
(45) Date of Patent: Sep. 22, 2020

(54) AQUARIUM HOUSING FOR VIEWING AQUATIC LIFE INCLUDING SYSTEMS AND METHODS ASSOCIATED THEREWITH

(71) Applicants: Jeffrey Allen Turner, Parkland, FL (US); Mark David Mackenzie, Loxahatchee, FL (US); Joseph Raul Corvison, Miami, FL (US)

(72) Inventors: Jeffrey Allen Turner, Parkland, FL (US); Mark David Mackenzie, Loxahatchee, FL (US); Joseph Raul Corvison, Miami, FL (US)

(73) Assignee: JELLYFISH ART, LLC, Coconut Creek, FL (US)

( * ) Notice: Subject to any disclaimer, the term of this patent is extended or adjusted under 35 U.S.C. 154(b) by 1095 days.

(21) Appl. No.: 15/159,459

(22) Filed: May 19, 2016

(65) Prior Publication Data

US 2017/0013811 A1    Jan. 19, 2017

Related U.S. Application Data

(60) Provisional application No. 62/255,067, filed on Nov. 13, 2015, provisional application No. 62/192,335, filed on Jul. 14, 2015.

(51) Int. Cl.
*A01K 63/04* (2006.01)

(52) U.S. Cl.
CPC .......... *A01K 63/042* (2013.01); *A01K 63/045* (2013.01)

(58) Field of Classification Search
CPC .. A01K 63/042; A01K 63/045; A01K 63/003; A01K 63/006; A01K 63/04; A01K 63/047
(Continued)

(56) References Cited

U.S. PATENT DOCUMENTS 1,838,215 A    12/1931  Clairmont
2,744,065 A *   5/1956  Lacey ................. A01K 63/042
                                                261/36.1
(Continued)

FOREIGN PATENT DOCUMENTS

EP    2153718    2/2010
GB    2176681    7/1989
JP    1098977    4/1998

*Primary Examiner* — Yvonne R Abbott-Lewis
(74) *Attorney, Agent, or Firm* — Malloy and Malloy PL; Jennie Malloy

(57) ABSTRACT

An aquarium structure for the housing and display of aquatic life, particularly jellyfish, adapted to provide a beneficial flow of fluid within it, such as a rising or suspending current. The aquarium structure includes a bottom surface, at least one sidewall, and a barrier disposed within in spaced apart relation to the bottom surface by a predetermined distance to form a gap therebetween. In preferred embodiments, the aquarium structure includes an air pump and also, is generally cylindrical in shape and disposed vertically along its major axis, to offer a wide area for viewing aquatic life within, and yet a relatively small and compact aquarium housing suitable for "desktop" use, although the invention may have other sizes and configurations. The aquarium housing can also include a lighting assembly disposed below the viewing area and configured to direct illumination therein and in some embodiments onto other surfaces above the aquarium housing.

3 Claims, 12 Drawing Sheets

(58) Field of Classification Search
USPC ....... 119/248, 259, 260, 261, 263, 245, 253, 119/257, 269; 210/220, 167.23, 167.26
See application file for complete search history.

(56) References Cited

U.S. PATENT DOCUMENTS

| | | | | |
|---|---|---|---|---|
| 3,149,608 A * | 9/1964 | Murphy | ................ | A01K 63/045 119/253 |
| 3,288,110 A * | 11/1966 | Goldman | ............. | A01K 63/006 119/248 |
| 3,472,381 A | 10/1969 | Halpert | | |
| 3,584,602 A | 6/1971 | Stasio | | |
| 3,891,555 A | 6/1975 | Bennett et al. | | |
| 4,014,293 A | 3/1977 | Salter | | |
| 4,272,372 A | 6/1981 | Fonseca | | |
| 4,443,335 A * | 4/1984 | Gullace | ................ | A01K 63/042 210/205 |
| 4,532,037 A | 7/1985 | Willinger | | |
| 4,703,720 A | 11/1987 | Shipman et al. | | |
| 4,727,040 A | 2/1988 | Freedman et al. | | |
| 4,776,127 A * | 10/1988 | Jackson | ............... | A01K 63/042 119/263 |
| 5,077,932 A * | 1/1992 | Hetherington | ......... | A01K 97/05 261/121.2 |
| 5,116,489 A | 5/1992 | Englert | | |
| 5,144,909 A | 9/1992 | Tominaga | | |
| 5,171,438 A | 12/1992 | Korcz | | |
| 5,297,513 A | 3/1994 | Musgrave | | |
| 5,732,657 A * | 3/1998 | Idbeis | .................. | A01K 63/006 119/257 |
| 6,276,302 B1 * | 8/2001 | Lee | ...................... | A01K 63/003 119/248 |
| 6,305,324 B1 | 10/2001 | Hallock et al. | | |
| 7,311,822 B2 | 12/2007 | Hochgesang et al. | | |
| 7,578,262 B2 | 8/2009 | Vaccari | | |
| 7,610,878 B2 | 11/2009 | Stime, Jr. | | |
| D669,229 S | 10/2012 | Andon | | |
| 8,393,298 B2 | 3/2013 | Andon | | |
| 8,726,840 B2 | 5/2014 | Furgalus | | |
| 8,851,015 B2 | 10/2014 | Furgalus | | |
| 2005/0224010 A1 * | 10/2005 | Nakayama | ........... | A01K 63/003 119/263 |
| 2007/0056523 A1 | 3/2007 | Stime, Jr. | | |
| 2009/0120860 A1 * | 5/2009 | Tsai | ..................... | A01K 63/045 210/167.26 |
| 2012/0188749 A1 | 7/2012 | Watanabe | | |
| 2014/0123904 A1 * | 5/2014 | Furgalus | ................ | A01K 63/04 119/260 |

* cited by examiner

AQUARIUM HOUSING FOR VIEWING AQUATIC LIFE INCLUDING SYSTEMS AND METHODS ASSOCIATED THEREWITH

CLAIM OF PRIORITY

The present Non-Provisional patent application claims priority pursuant to 35 U.S.C. Section 119(e) to a prior filed Provisional patent application, namely, that having Ser. No. 62/192,335 filed on Jul. 14, 2015, as well as to another prior filed Provisional application, namely, that having Ser. No. 62/255,067 filed on Nov. 13, 2015, the contents of which are both incorporated herein by reference in their entireties.

BACKGROUND OF THE INVENTION

Field of the Invention

The present invention is directed to a new and useful aquarium structure intended for housing various aquatic life, but perhaps most beneficially jelly fish, as described further herein, and which is adapted for providing a beneficial flow of fluid therein, as well as methods for implementing such a beneficial flow of fluid within the structure. The present invention is also directed to an aquarium housing which in the illustrated embodiment is generally cylindrical in shape, and preferably, which is effectively disposed vertically along its major axis. As such, a relatively small and compact aquarium housing can be offered, which is readily suitable for "desktop" use, even though the present invention is scalable to other sizes, and even other configurations. Moreover, the aquarium housing of the present invention can be structured to include a lighting assembly disposed below the viewing area and configured to direct illumination therein and in some embodiments onto another surface above the aquarium housing or vessel.

Description of the Related Art

There are some aquariums, tanks, and other structures already known that facilitate a current of moving water necessary for the housing of certain aquatic life, such as jellyfish. Some would say that jellyfish require a constant motion of fluid within the aquarium, but whether they do or not, it is understood that jellyfish benefit from a current or fluid moving around within an aquarium. In one particular structure that is known, a round "drum-like" tank, also known as a "Kreisel" tank, is provided that is disposed in a horizontal plane along its major axis, with an externally disposed hydraulic pump used to create a current. One of the drawbacks, however, associated with this known structure is that it does not offer a compact footprint, due to its horizontally disposed configuration. Moreover, the utilization of one or more externally placed pumps requires the formation of one or more ports through the exterior walls of the tank in order to introduce tubing and/or other plumbing there through and maintain the hydraulic pump in fluid communication with the fluid within the vessel. This is considered to be another drawback given that any ports placed through the exterior wall are susceptible to leaks. Additionally, the Kreisel tank substantially relies on its horizontally disposed drum shape to facilitate the constant motion and flow path of water therein. As such, while the structure of this known aquarium may be configured to offer a "footprint" as would be suitable for deployment in a small or confined office, the present invention presents a substantial leap forward in terms of offering space saving configurations, due at least partially to its vertically disposed orientation, that were heretofore not believed to be entirely possible.

While some existing aquarium structures are known which utilize air pumps to provide some air and/or movement to the water held within an aquarium, even these structures still rely on the typical horizontal drum shape of the Kreisel design in order to cause or facilitate a rotational water flow current within the aquarium, which some aquatic species, such as jelly fish, are believed to require.

SUMMARY OF THE INVENTION

The present invention is intended to solve some of the needs in this field of art, and as such, is directed to a new and unique aquarium structure, including systems and methods, for housing and viewing various aquatic life, and in particular, aquatic life that benefits from an established flow of fluid within it. Accordingly, one aspect of the present invention is directed to an aquarium structure designed and configured to establish such a beneficial fluid flow within a housing of the invention.

In one embodiment, the present invention is directed to an aquarium structure, also referred to as a vessel herein, provisioned with operative structuring, and utilized in conjunction with various components in order to establish a "rising" or "suspending" flow of water or current within the housing of the vessel. As such, certain aquatic life, such as jellyfish or sea jellies, can be prominently displayed within a viewing area of the housing. It should be understood that without this rising or suspending current, most species of these creatures would probably and generally sink to the bottom of any aquarium. Further, without any current provided in an aquarium, the overall health and motive capabilities of any jellyfish would deteriorate. Additionally, in at least one embodiment the present invention can generate this beneficial fluid flow while also being designed and configured to direct debris, excess food particles and the like into a filtration area of the vessel, thereby providing further benefit to the aquatic life and enhancing their display without any or with minimal distractions.

In one or more embodiments, the present invention additionally comprises a generally cylindrical shaped vessel. As such, embodiments depicted herein illustrate an aquarium or tank that is effectively disposed in a vertical plane along its major axis, and this feature is one, among others, that is believed by the inventors herein to be both novel, highly unique and a significant step forward in this field of art. Also, while the various Figures reflect a cylindrically shaped vessel which may be produced so as to be of relatively small and compact in size, it is pointed out that the invention is scalable to other sizes, and also that the configuration of the present invention's housing may comprise other shapes, whether a square, rectangle, oval or diamond, to name only a few.

In another embodiment, the generally cylindrical shaped vessel will preferably include both an upper housing and a lower housing. The upper housing may include a viewing area, with a translucent or transparent panel, or portion thereof. The upper housing may also include a partition that at least partially defines the viewing area, and that at least partially defines a filtration chamber, each of which is ideally disposed oppositely about the partition. The partition may include at least one aperture, or alternatively one or more baffles or vents to facilitate flow of fluid through the partition, which may comprise any of a plurality of configurations such as slots, perforations, or indicia. The partition may also include an air channel that is preferably disposed on a filtration chamber facing side of the interior wall. A tubing for air or air-line may be disposed therein which is further disposed in communication with an air pump. The air channel may also be flanked by one or more rear compartments, at least partially defined by the partition. The rear compartments are further disposed in fluid communication with the air channel, at a lower portion thereof. In at least one preferred embodiment a gap is provided between the partition and the bottom surface of the upper housing, facilitating passage of fluid between the interior wall and the bottom surface of the aquarium. This gap can vary in size but in most embodiments will usually be rather small, such as generally about 1/16th of an inch along all or a substantial portion of its length, between the bottom surface of the upper housing and the partition.

In yet another embodiment, the invention comprises a method of establishing the beneficial flow of fluid within the vessel via introduction of air into a lower portion of a relatively narrow air channel, thereby drawing fluid up through the air channel with the rising of the air. Cooperatively disposing the air channel in fluid communication with the viewing area and filtration area thus establishes a beneficial flow throughout the vessel, with fluid intake into the air channel drawn from the viewing area, which is then passed through the filtration area, and is finally returned to the viewing area once filtered. Moreover, disposing the return into the viewing area below the intake from the viewing area serves to establish such a rising or suspending current as described above.

It will be appreciated that the use of an air pump and the introduction of air into the vessel are not strictly required to accomplish the motive force that establishes the beneficial flow of fluid. It may also be accomplished via, for example, the provision of a liquid pump. However, as discussed above, liquid pumps tend to provide overly complicated mechanisms that must be disposed in fluid communication with the interior of the housing. An air pump, in distinction, may be disposed where convenient, drawing air from the local atmosphere. Moreover, the air may simply be routed and delivered where necessary with the use of air lines.

Additionally, certain aquatic life may be sensitive to fluid flow rates, such as certain types of jellyfish that are thought to require exceedingly gentle currents. For example, aquatic life with low mobility capabilities may become trapped against the intake, due to the suction created as fluid is drawn through narrow apertures in the viewing area. As such, certain embodiments of the invention may include systems for adjusting the fluid flow rate within the housing, such as by providing adjustable valves which modulate the flow of air into the air channel, thereby affecting the rate at which fluid is drawn from, and returned to, the viewing area.

As an alternative solution, or even a supplemental solution to the provision of adjustable valves, the present invention may include additional structural elements which establish a "fluid curtain" or a cross-flow relative to the intake. As such, a rate of fluid flow can be maintained which is sufficient to adequately remove debris from the viewing area, but aquatic life is no longer subjected to becoming trapped against the intake, as they are diverted from the intake by the fluid curtain.

Yet another aspect of the present invention comprises an auxiliary return vent disposed in fluid communication with a top surface of the fluid within the vessel. The auxiliary return vent is operatively dimensioned to only allow a certain, small, portion of fluid to be returned to a top surface of the fluid within the viewing area. Accordingly, the surface tension of the fluid is disturbed which contributes to the wetting of food placed within the housing, without calling for additional agitation.

In an additional embodiment, the vessel of the present invention may also include a lower housing, below the viewing area, which provides space for disposition of various components such as an air pump and a lighting assembly. In certain embodiments, the disposition of the lighting assembly below the viewing area provides for illumination of aquatic life from below, which in the case of jellyfish or other at least partially translucent animals, can provide a colored and/or glowing effect to the aquatic life.

In certain embodiments the lighting assembly is capable of projecting light in a variety of colors. For example, the lighting assembly may include a light emitting diode assembly with red, green, and blue diodes operatively connected to a micro-controller, or other controlling device, in order to modulate the combination of red, green, and blue light projected to establish a variety of color illumination available. Moreover, a remote control assembly may be provided which is operative to control the illumination assembly such as turning on or off, or changing the color of illumination. For example, the remote control assembly may comprise an infrared receiver connected to the illumination assembly and configured to receive control signals from an infrared remote. In alternative embodiments, the remote control assembly may comprise a radio frequency receiver, such as a BLUETOOTH or WiFi capable receiver, configured to receive instructions from a remote control comprising a mobile device such as a "smartphone" cellular telephone.

In one particular embodiment, an upper lid, or vessel cover, may include an aperture there-through that could be configured in the shape of any of a variety of indicia. As such, the lighting assembly, disposed below the viewing area and configured to direct illumination therein, will also illuminate the indicia, which in turn provides a projected image of the indicia on any surface above the vessel. Such a projection can contribute to the overall aesthetic appeal provided by the present invention. In a preferred embodiment, the lighting assembly provides a "point source" of illumination, in contrast to a diffused illumination, in order to facilitate the projection of the indicia. This may be accomplished, for example, by utilizing a flat, clear lens over the illumination assembly, as well as disposing the illumination assembly directly below the indicia or nearly directly and in line with but below the indicia.

The indicia may, for example, include a company's trademark and/or logo, such as one particular example of a proprietary trademark and logo shown in the Figures, but also many other shapes such as a star, a flower, a crescent moon, a triangle, or several of them, to name a few.

In at least one embodiment, a port is disposed on a panel or sidewall of the upper housing in a predetermined position relative to the fluid level of the aquarium. When fluid is to be added or exchanged to that already in the upper housing, the port may be opened to allow fluid to flow from the aquarium. Such a configuration facilitates the exchange of fluid by avoiding a mess, e.g., as might occur in siphoning fluid from the aquarium.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE INVENTION IN THE ILLUSTRATED EMBODIMENT(S)

Figure 1:
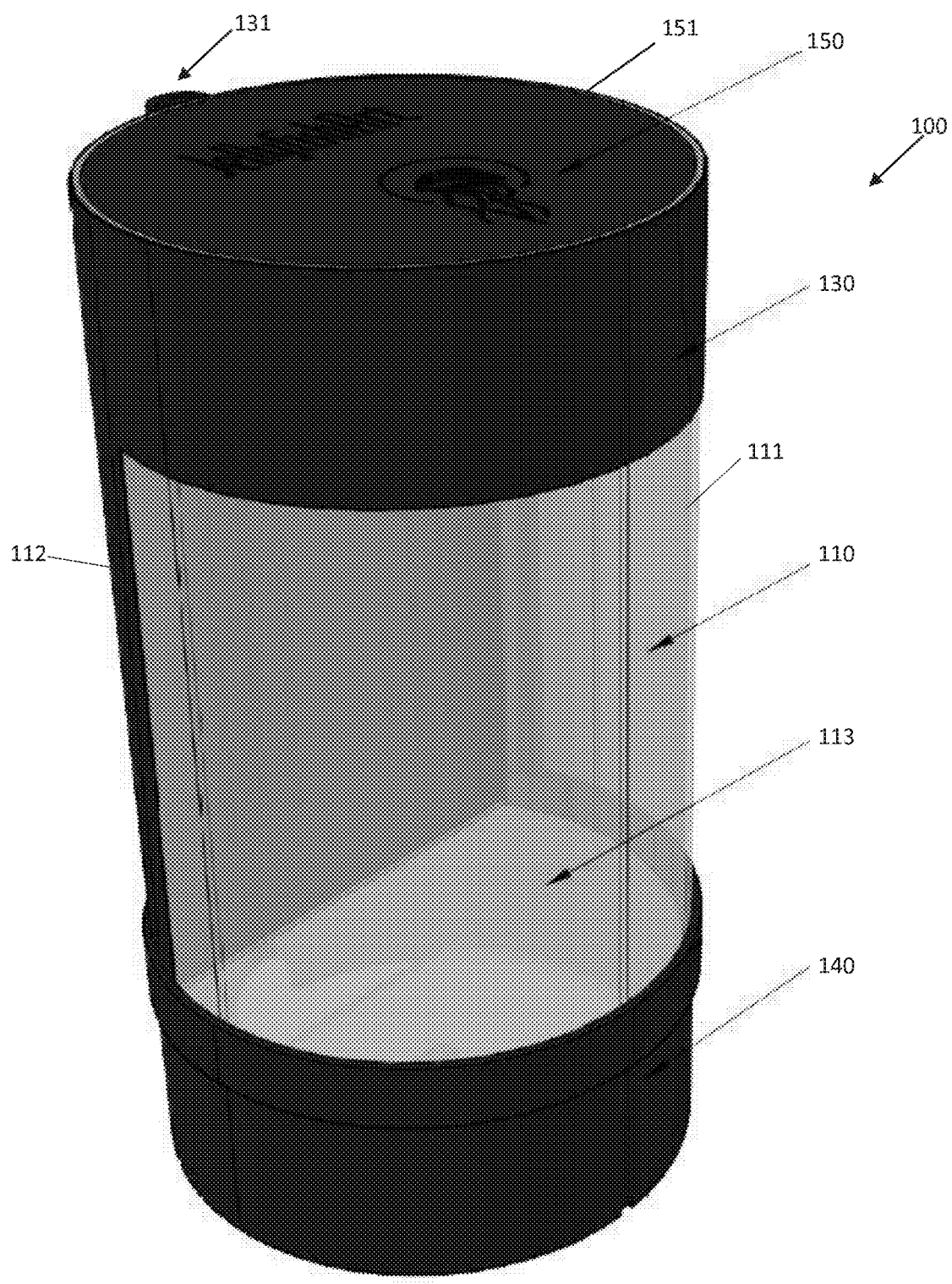
FIG. 1 is a perspective view of a vessel according to one embodiment of the present invention.

FIG. 1 is a perspective view of an aquarium structure, also referred to as a vessel 100 herein, suitable for housing and displaying aquatic life, in accordance with one embodiment of the present invention. The depicted embodiment includes an upper housing 130 and a lower housing 140. The upper housing 130 is generally defined by a sidewall 112 and bottom panel 113 cooperatively structured to retain fluid therein. The sidewall 112, or at least a portion thereof, may also include a viewing panel 111 comprised of an at least partially transparent panel facilitating viewing of aquatic life within the viewing area 110 of the vessel 100. The vessel 100 may also include a vessel cover 150 with indicia 151 carried thereon or formed therein. In the depicted embodiment, the vessel 100 also includes a lower housing 140 which, as will be discussed in further detail, can house a variety of components.

Figure 2:
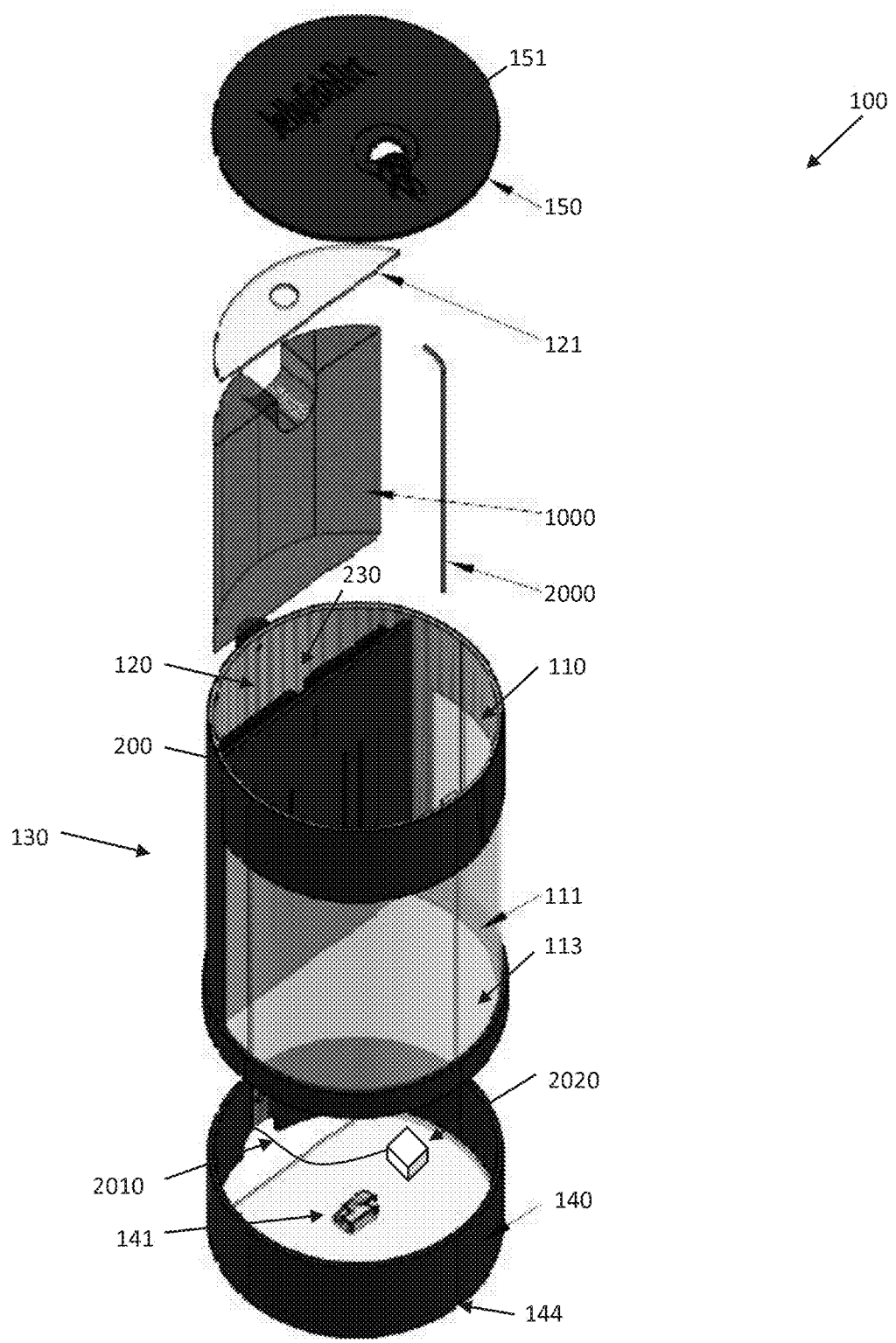
FIG. 2 is an exploded perspective view of a vessel according to one embodiment of the present invention.

Now with reference to FIG. 2, depicted therein is an exploded view of the vessel 100 of the present embodiment shown in FIG. 1. As can be seen, the upper housing 130 at least partially defines the viewing area 110, as well as a filtration area 120. The viewing area 110 and filtration area 120 are also defined by a partition 200 disposed within the upper housing 130. Any of a variety of filter media 1000 may be disposed within the filtration area 120 such as molded foam, activated charcoal, and the like, or in combinations thereof. Additionally, a filtration area cover 121 may be provided to overlie the filtration area 120, below the vessel cover 150. An air-line 2000 is also provided to be utilized in conjunction with the partition 200, and particularly by disposition within the air channel 230 thereof, thereby delivering air to a lower portion of the air channel 230.

Figure 4:
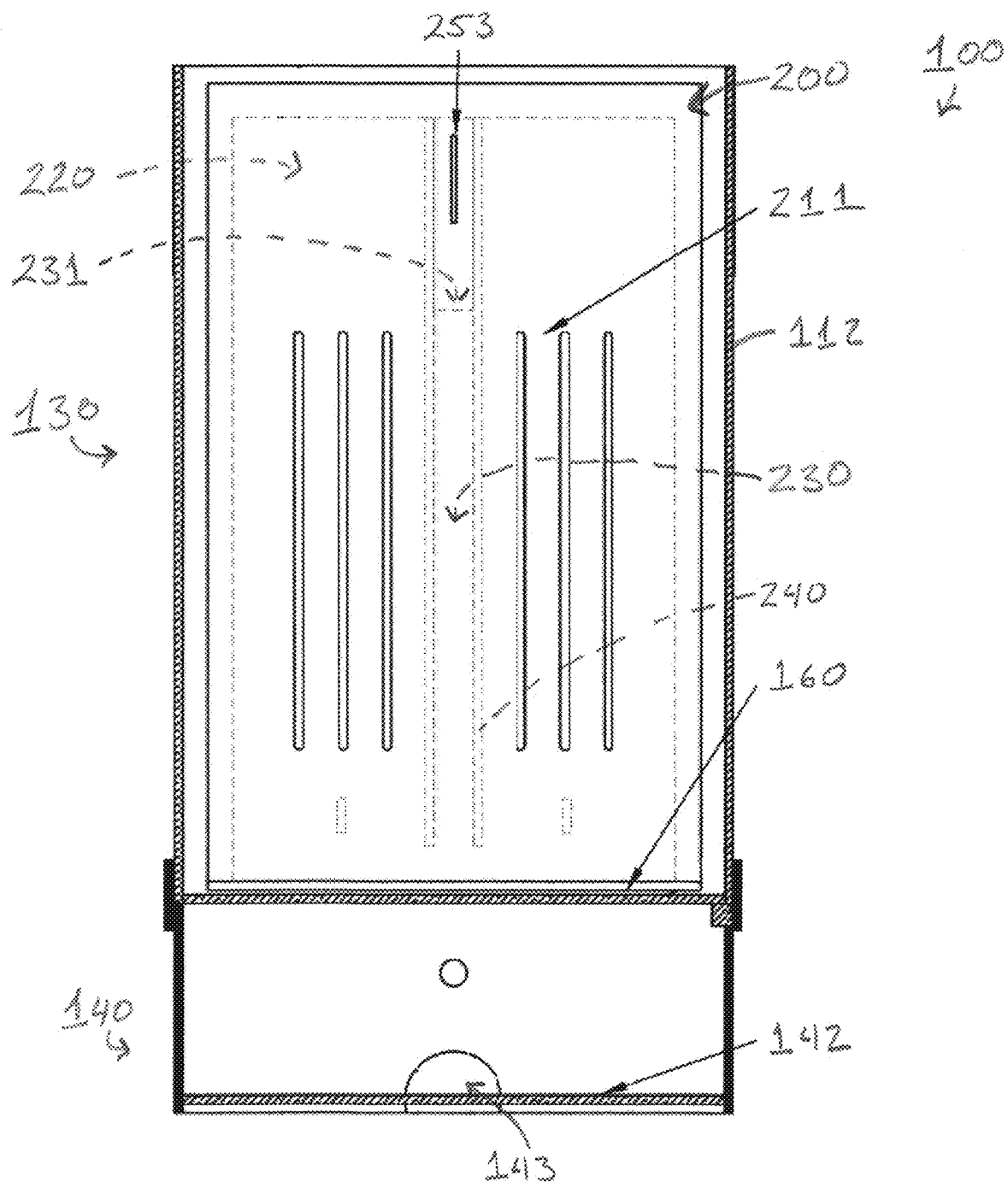
FIG. 4 is a section view taken along line 4-4 of FIG. 3.

With continuing reference to FIG. 2, the lower housing 140 is depicted in further detail, including an air pump 2020 and air tubing 2010, an illumination assembly 141, a panel 142 for retaining of various components, and an access port 143 (as depicted in FIG. 4) for disposition of electrical or fluid lines there-through. As will be appreciated, the air pump 2020 may be disposed in fluid communication with the air-line 2000 via a length of air tubing 2010 provided. Additionally, the depicted embodiment includes a bottom panel 113 which is at least partially transparent, and which facilitates illumination of the viewing area 110 from an illumination assembly 141 disposed within the lower housing 140. Furthermore, an infrared (IR) receiver port 144 may be provided in embodiments where the illumination assembly 141, or other components, may be controlled via an infrared remote control.

Figure 3:
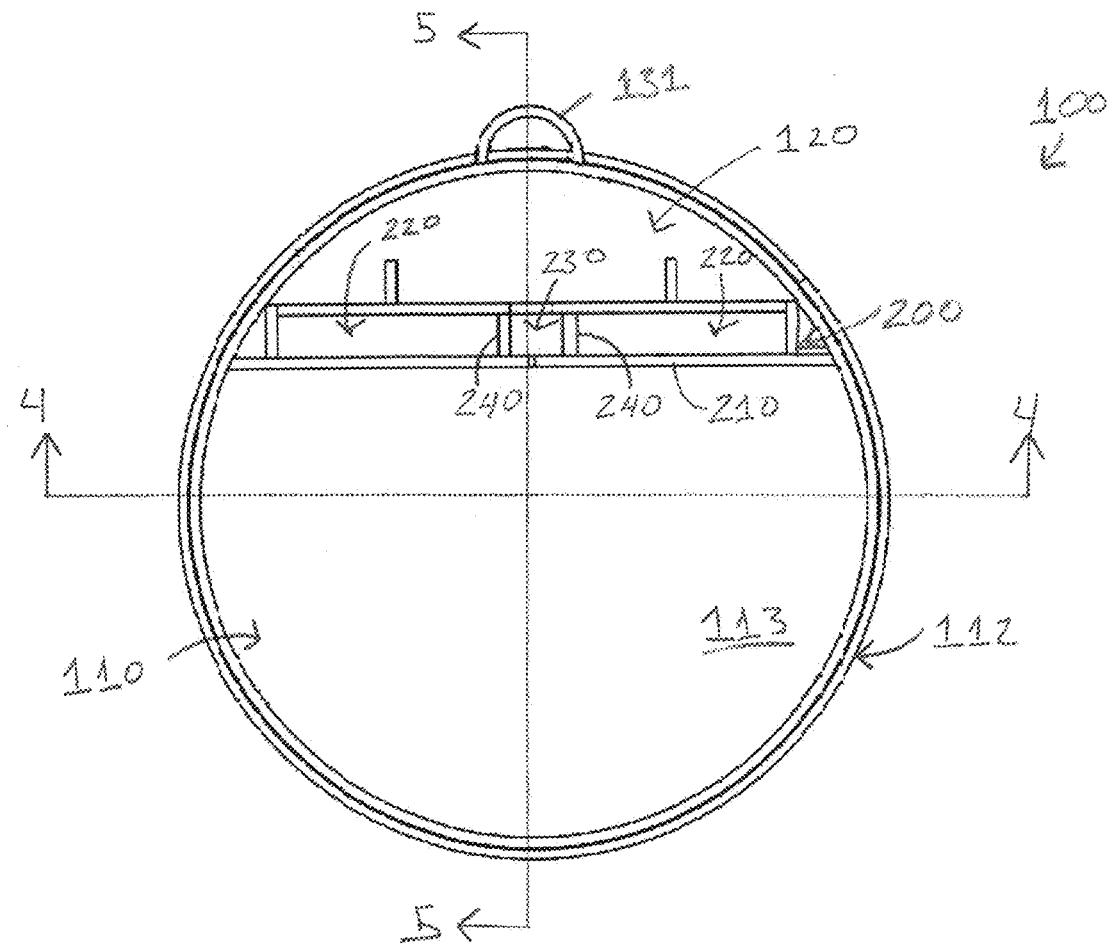
FIG. 3 is a top plan view of a vessel according to one embodiment of the present invention.

With reference now to FIG. 3, there is shown a top plan view of a vessel with the vessel cover 150 and filtration area cover 121 removed, as well as the filter media 1000 and air-line 2000, such that the interior portions of the upper housing 130 may be viewed. As can be seen, the upper housing 130 generally includes a viewing area 110 and filtration area 120 divided by a partition 200. The partition 200 may also include various structuring which facilitates a desired flow pattern of fluid within the vessel 100. In the depicted embodiment the partition 200 includes a barrier 210 that somewhat substantially bisects the upper housing 130. A rear chamber 220 is disposed on the partition 200 within the filtration area 120 and an air channel 230 is disposed with the rear chamber 220 in fluid communication therewith. In at least some embodiments an air-line 2000 (depicted in FIG. 2) may be disposed within the air channel 230.

FIG. 4 is a section view taken along line 4-4 of FIG. 3, including certain structures represented in dashed lines which are disposed behind the barrier 210. As can be seen, there is a plurality of apertures 211 disposed through the barrier 210 allowing fluid communication between the viewing area 110 and the rear chamber 220. A vent 253 is also disposed through the barrier 210 facilitating fluid communication between the viewing area 110 and the air channel 230. Additionally, the air channel 230 is at least partially defined by a plurality of baffles 240 that are shorter in length then the rear chamber 220, allowing fluid communication between the air channel 230 and rear chamber 220 at a lower portion thereof. Moreover, at an upper portion, the air channel 230 includes an edge 231 which facilitates fluid communication between the air channel 230 and filtration area 120. Finally, a gap 160 is disposed between the partition 200 and the bottom panel 113, facilitated by a spaced relation of the partition 200 to the bottom panel 113.

Figure 5:
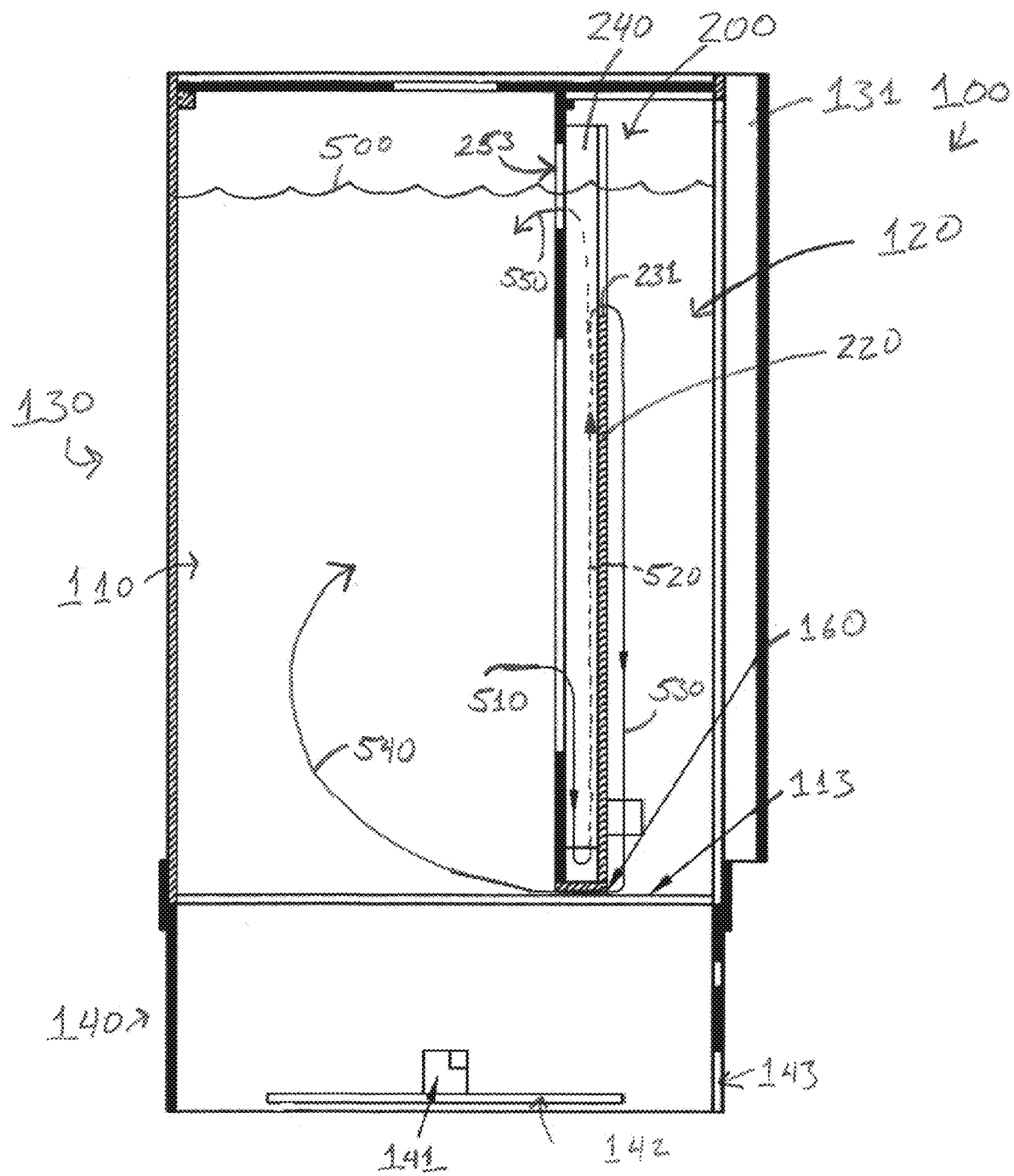
FIG. 5 is a section view taken along line 5-5 of FIG. 3.

FIG. 5 is a section view taken along line 5-5 of FIG. 3. FIG. 5 presents an intended flow path of fluid throughout the vessel 100 that creates a beneficial flow, as well as a rising or suspending current within the viewing area 110. As depicted, the vessel 100 has been partially filled with fluid such that a fluid surface 500 thereof is able to communicate through the vent 253. With reference to the arrows labeled 510 through 550, the beneficial flow may be visualized. Fluid at 510 is drawn in through the apertures 211 (as best shown in FIG. 4) and into the rear chamber 220. Within the rear chamber 220, the fluid may be introduced into the air channel 230 (also best shown in FIG. 4) at a lower portion thereof, which is depicted at 520 in FIG. 5. Note that the fluid within the air channel 230, as well as the air channel 230 itself are depicted with dashed reference lines. This is because, in the section view presented by FIG. 5, the air channel 230 is obscured by the baffle 240 which defines one side of the air channel 230.

With continuing reference to FIG. 5 the fluid may continue to rise within the air channel 230 until a portion of it meets with the edge 231 of the air channel 230, where it is allowed to flow into the filtration area 120. A smaller portion of the fluid is allowed to return directly to the viewing area 110, as at 550, in order to create a small amount of turbulence on the top surface 500 of the fluid. Fluid is otherwise directed through the filtration area 120, as at 530, toward the gap 160 between the partition 200 and the bottom panel 113. The fluid which is drawn in through the aperture(s) 211 must be replaced, and as such, it is drawn through the gap 160 to create a rising current, as at 540.

As will be appreciated, introduction of air or air bubbles at a lower portion of the air channel 230 facilitates a rising current therein, which creates the motive force that drives the beneficial flow depicted with reference to numerals 510 through 540. Additionally, food, waste, or other particulate matter which would otherwise rest on the bottom panel 113, is swept upwards by the rising current 540, and drawn through the apertures 211 for eventual filtration. In this configuration, a beneficial flow of fluid is established within the vessel that not only draws fluid downward through the filtration area 120, from the air channel 230 to the gap 160, thereby filtering out particulate matter and introducing filtered fluid back in to the viewing area 110, but also establishes a rising or suspending current within the viewing area 110, by introducing fluid into the viewing area 110 near the bottom panel 113 and drawing fluid from the viewing area at a point there above through the apertures 211. Therefore, the present vessel is especially suitable for housing and displaying aquatic life that thrives in a gentle current such as jellyfish. The suspending current prevents the jellyfish from sinking to the bottom of the viewing area 110 and holds them prominently within the viewing area 110.

As can also be seen in FIG. 5, the vessel 100 has been provided with fluid sufficient for the top surface 500 of the fluid to communicate through the vent 253. Additionally, as will be appreciated, in order for fluid rising through the air channel 230 to be diverted through the vent 253, the top surface 500 must be at least as high as the lower portion of the vent 253. Conversely, it may not be desirable to provide the vessel 100 with as much fluid as would be required to rise above the vent 253, as that would dispose the fluid in condition to flow freely between the filtration area 120 and viewing area 110 without having been passed through a filter medium first, for example over the top of the partition 200. As such, in the depicted embodiment, the vent 253 is appropriately configured to serve as a convenient minimum-maximum fluid fill reference for a user of the vessel 100.

Figure 6:
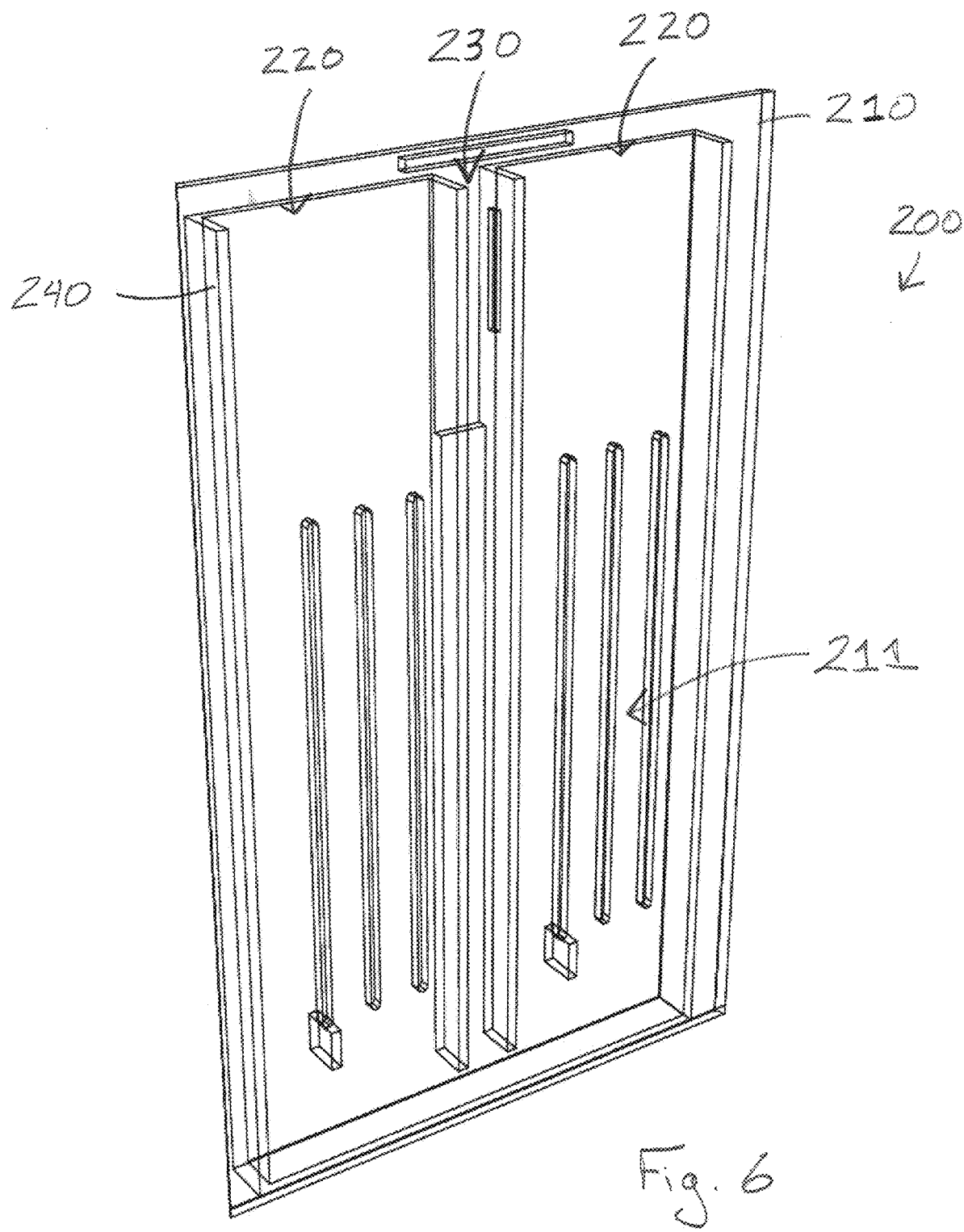
FIG. 6 is a perspective view of a partition according to one embodiment of the present invention.

FIG. 6 presents a front view of a partition 200 according to one embodiment of the present invention depicted in FIGS. 1 through 5, wherein the barrier 210 is presented in at least partially transparent configuration, such that the operative structuring of the rear chamber 220 and air channel 230 may be easily viewed for clarification, as supplemental to the disclosure of FIGS. 1 through 5.

Figure 7:
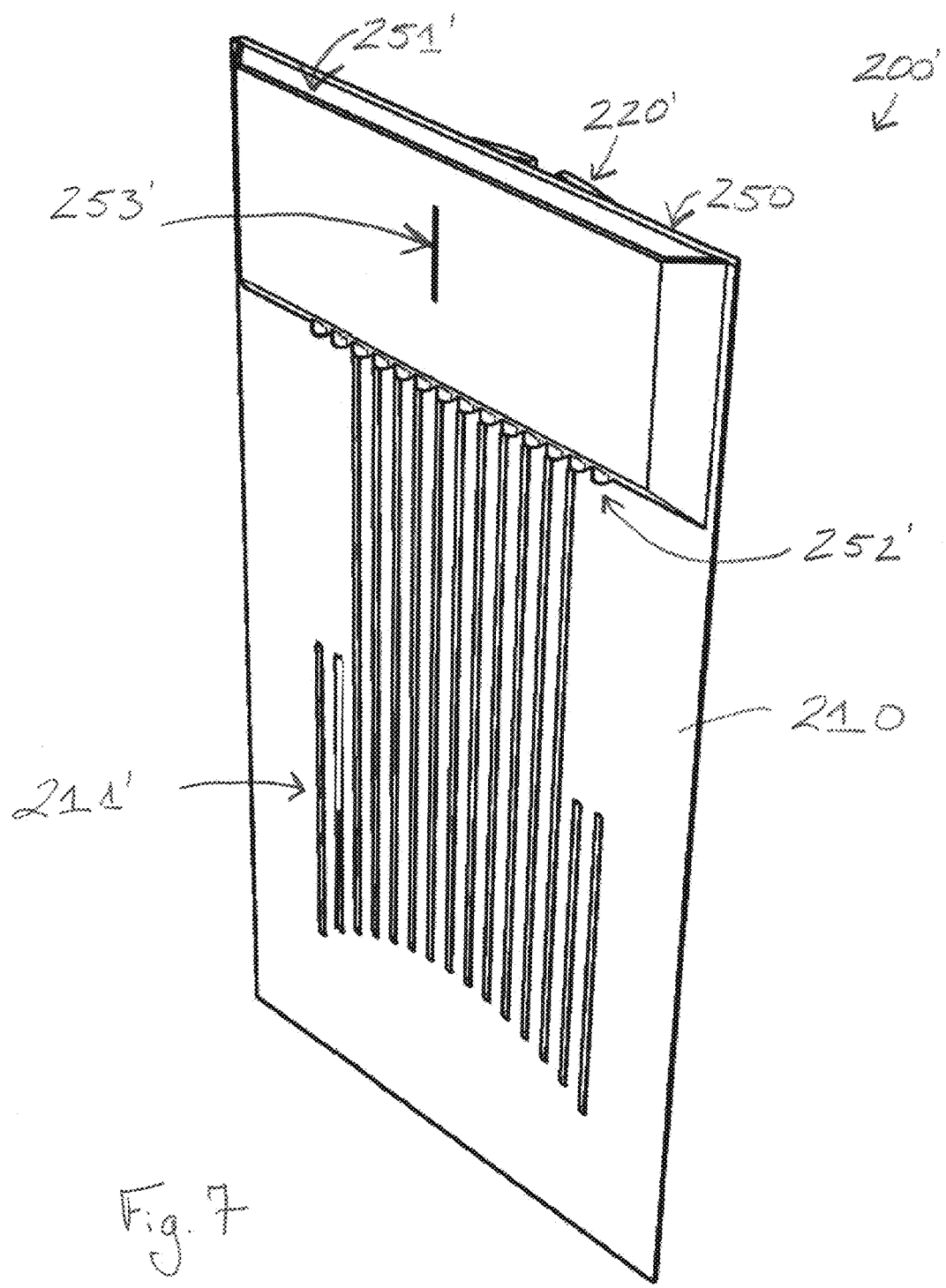
FIG. 7 is a front perspective view of a partition according to another embodiment of the present invention.
Figure 8:
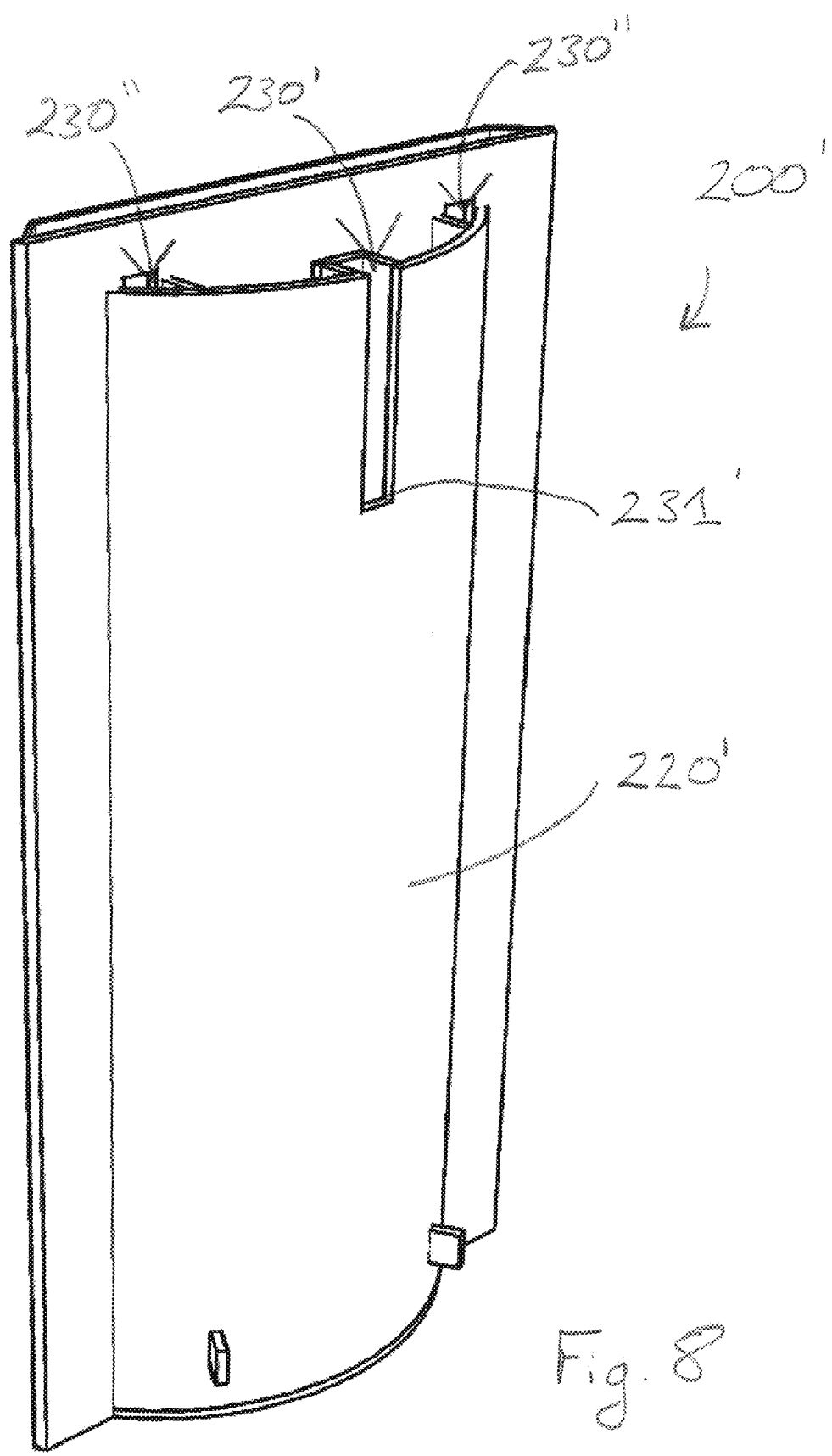
FIG. 8 is a rear perspective view of a partition according to another embodiment of the present invention.
Figure 9:
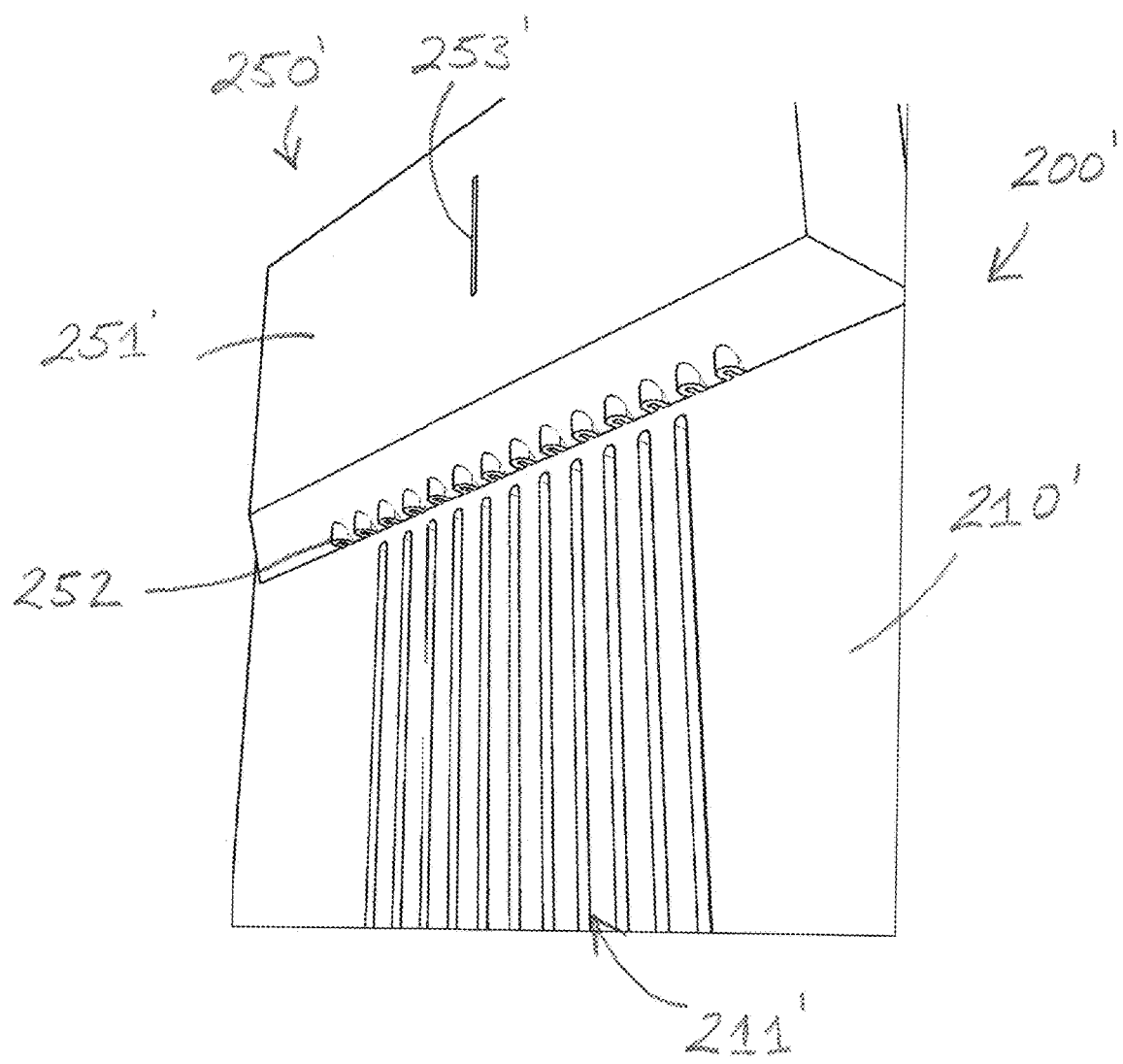
FIG. 9 is a detail perspective view of a partition according to another embodiment of the present invention.

FIGS. 7, 8, and 9 depict a barrier 200' according to another embodiment of the invention, wherein various features have been configured in alternative arrangement to those depicted in FIGS. 1 through 5. Additionally, the barrier 200' depicted in FIGS. 7 through 9 includes some additional features which contribute to improved operation of the present invention. It will be appreciated that no single configuration or feature is exclusive to any single embodiment of the invention, such that the various features and configurations thereof of the present embodiment may be combined with features and configurations thereof of alternative embodiments.

With reference to FIG. 7, a front perspective view of the barrier 200' is presented. As can be seen, the apertures 211' are presented in a differing configuration. It will be appreciated that, as long as one or more of the apertures 211' (and also 211 of the previous embodiment) are formed with sufficient diameter to facilitate the beneficial flow of fluid, they may present in virtually any configuration desired. Additionally, it may be seen that an upper drain assembly 250' is included in the present embodiment, which includes a trough 251' disposed on a front surface of the barrier 210'. The trough 251' includes a vent 253', of substantially similar configuration to previous embodiments, but also includes a plurality of drains 252'.

FIG. 8 is a rear perspective view of the barrier 200'. Therein, it can be seen that the rear chamber 220' may comprise a rounded configuration. Moreover, it can be seen that a plurality of air channels 230', 230" are provided. Additionally, as in previous embodiments, a lower edge 231' is provided on a central air channel 230', such that fluid may be delivered to a filtration area, as substantially described above.

FIG. 9 is a detail view of an upper drain assembly 250' of the present embodiment. As can be seen, the plurality of drains 252' are configured in alternating or at least non-aligned relation to the plurality of apertures 211'. As such, streamlines of fluid exiting the drains 252' may form an alternating cross-flow with fluid entering the apertures 211', without substantial interference to either flow. As such, a "fluid curtain" is formed by the fluid exiting the plurality of drains 252'. In this embodiment, aquatic life is prevented from become trapped against the apertures 211' due to the suction formed therein. This is so because aquatic life intended to be stored in the vessel 100' of the present invention will generally be much larger than the apertures 211' and will be intercepted by the "fluid curtain" and diverted away from the apertures 211' prior to becoming trapped.

Figure 10:
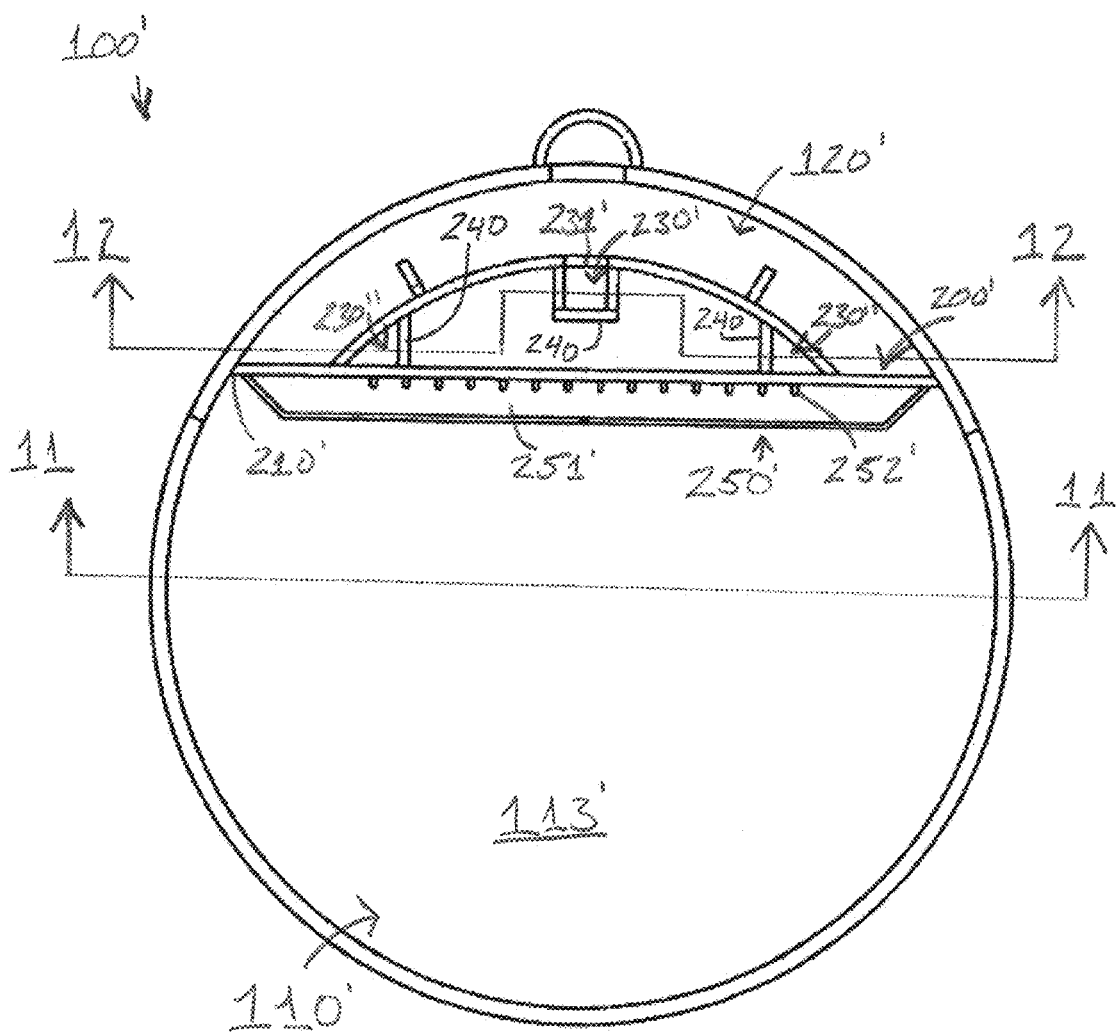
FIG. 10 is a top plan view of a vessel according to another embodiment of the present invention.

FIG. 10 is a top plan view of one embodiment of a vessel 100' in which the partition 200' of FIGS. 7 through 9 might be deployed. The vessel includes a viewing area 110' and filtration area 120', separated and at least partially defined by the partition 200'. It can be seen that the partition 200' includes three separate air channels 230', 230". A central air channel 230' is formed by baffles 240' wholly within the rear chamber 220' and, when air is introduced therein, is utilized to direct fluid from the rear chamber 220' into the filtration area 120'. A pair of auxiliary air channels 230" flank the central air channel 230' and are at least partially defined by baffles 240', the rear chamber 220', and the barrier 210'. When air is introduced within the auxiliary air channels 230", they may be utilized to direct fluid from the rear chamber 220' into the upper drain assembly 250'.

Figure 11:
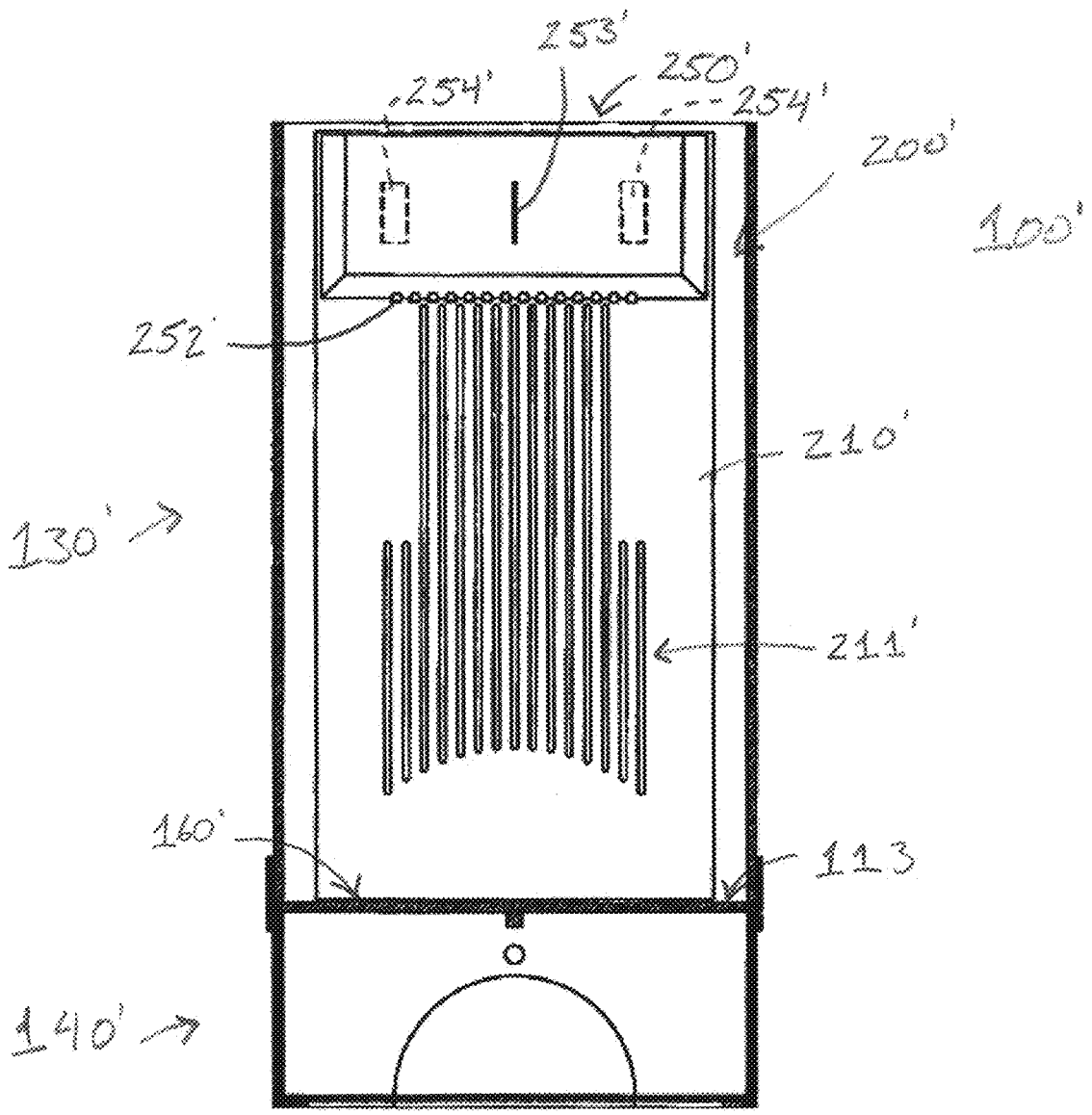
FIG. 11 is a section view taken along line 11-11 of FIG. 10.
Figure 12:
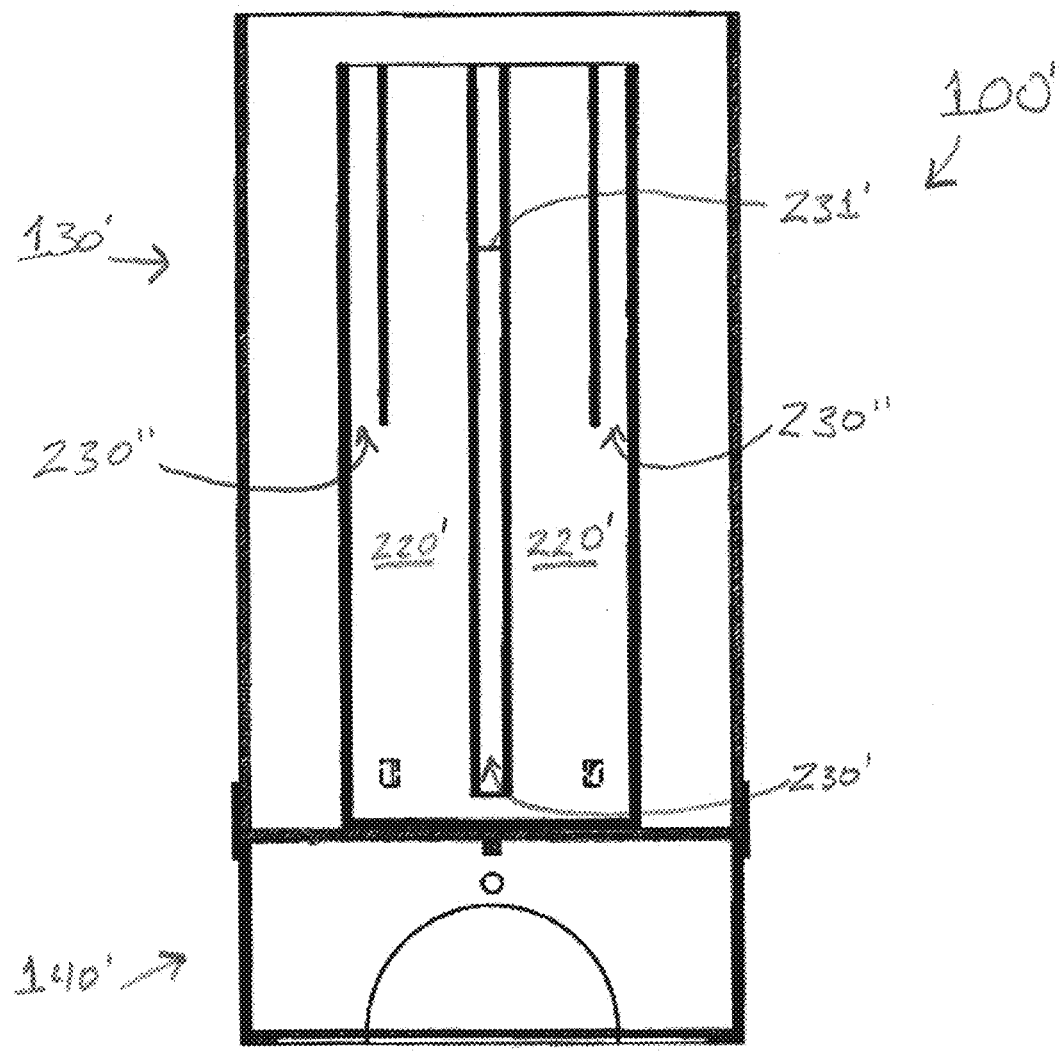
FIG. 12 is a section view taken along line 12-12 of FIG. 10.

FIG. 11 is a section view taken along line 11-11 of FIG. 10. As can be seen, a pair of upper drain apertures 254 are depicted in dashed lines (due to their position behind the upper drain assembly 250' in the present view) which facilitate fluid communication from the auxiliary air channels 230" (as depicted in FIGS. 11 and 12) into the trough 251' of the upper drain assembly 250'. It may also be seen that the partition 200' is disposed in spaced relation to a bottom surface 113' of the vessel 100, thereby creating a gap 160', facilitating a substantially similar beneficial flow and rising current within the viewing area 110' as described in previous embodiments.

FIG. 12 is a section view taken along line 12-12 of FIG. 10. As can be seen the central air channel 230' is partially defined by baffles 240' which run, substantially, along the length of the partition 200'. In certain embodiments, it will be necessary to introduce air at a lower portion of the central air channel 230' such that sufficient motive force, caused by the rising air, can be developed to drive the beneficial flow throughout the vessel 100'. However, it will also be seen that the auxiliary air channels 230" are shorter in length than the central air channel 230', this is so, in certain embodiments, because a much lower motive force need be developed in the auxiliary air channels 230", relative to the central air channel 230', due to merely delivering fluid to the trough 251' through the upper drain apertures 254'. As such, it will be appreciated that air channels, either the central air channel 230' or auxiliary air channels 230", may be disposed in fluid communication with the rear chamber 220' at either a middle or upper portion thereof, depending upon the desired motive force to be developed therein.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method for establishing a beneficial flow within a vessel, the method comprising:
   providing an air pump for use in conjunction with the vessel, the vessel including at least:
   a bottom surface and at least one sidewall;
   a barrier disposed within the vessel;
   the barrier further disposed in spaced relation with the bottom surface at a predetermined distance therefrom;
   the predetermined distance at least partially defining a gap between the barrier and the bottom surface;
   the barrier at least partially defining a viewing area and a filtration area opposite the viewing area within the vessel;
   a rear chamber further disposed on the barrier at least partially within the filtration area, the rear chamber in fluid communication with the viewing area via at least one aperture in the barrier;
   the rear chamber further including an air channel at least partially defined by a plurality of baffles, the air channel disposing a lower portion of said rear chamber in fluid communication with the filtration area;
   disposing at least one air line between the air pump and a lower portion of the air channel of the vessel;
   operating the air pump such that air is delivered to the lower portion of the air channel of the vessel;
   allowing a motive force to be established within the air channel via the rising of air within the air channel.

2. A method for establishing a suspending current within a vessel suitable for housing and displaying aquatic life, the method comprising:
   providing a vessel with a viewing area, internal partition, and filtration area;
   the viewing area and filtration area at least partially defined by the internal partition;
   introducing fluid into the viewing area at a lower portion of the vessel;
   drawing fluid from the viewing area at a portion of the vessel that is above the area at which fluid is introduced into the viewing area.

3. The method as recited in claim 2 further comprising directing the introduction of the fluid into the viewing area at a lower portion of the vessel at least partially across a bottom surface of a vessel so as to disturb debris on the bottom surface of the vessel.

* * * * *